US011305828B2

(12) United States Patent
Sera et al.

(10) Patent No.: US 11,305,828 B2
(45) Date of Patent: Apr. 19, 2022

(54) WORK VEHICLE

(71) Applicant: Kubota Corporation, Osaka (JP)

(72) Inventors: Takashi Sera, Sakai (JP); Takashi Oda, Sakai (JP); Hisao Mukai, Sakai (JP); Takuya Tanigawa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/115,794

(22) Filed: Dec. 9, 2020

(65) Prior Publication Data

US 2021/0197905 A1 Jul. 1, 2021

(30) Foreign Application Priority Data

Dec. 25, 2019 (JP) ............................. JP2019-234515
Dec. 25, 2019 (JP) ............................. JP2019-234516

(51) Int. Cl.
*B62D 49/06* (2006.01)
*A01B 63/10* (2006.01)
*A01B 71/00* (2006.01)
(Continued)

(52) U.S. Cl.
CPC ...... *B62D 49/0692* (2013.01); *A01B 63/1006* (2013.01); *A01B 71/00* (2013.01);
(Continued)

(58) Field of Classification Search
CPC ............ B62D 49/0692; B62D 49/0671; A01B 63/1006; A01B 71/00; F16H 21/52
See application file for complete search history.

(56) References Cited

U.S. PATENT DOCUMENTS 2,679,199 A 5/1954 Strehlow
4,713,981 A 12/1987 Zahn
(Continued)

FOREIGN PATENT DOCUMENTS

EP 0066380 12/1982
EP 0066380 A2 * 12/1982 ......... A01B 63/1006
(Continued)

OTHER PUBLICATIONS

Extended European Search Report for corresponding EP Application No. 20209533.7-1004, dated May 18, 2021.

*Primary Examiner* — Vicky A Johnson
(74) *Attorney, Agent, or Firm* — Mori & Ward, LLP

(57) ABSTRACT

A work vehicle includes a link mechanism to be equipped with a work implement, a drive mechanism to drive the link mechanism to ascend and descend the work implement, and a control lever is to be operated to ascend and descend the work implement. The work vehicle includes a first displacement transmission mechanism, an additional operational mechanism, and a second displacement transmission mechanism. The first displacement transmission mechanism links the drive mechanism and the control lever to transmit a displacement of the control lever to the drive mechanism. The additional operational mechanism is configured to operate the control lever at a location apart from a position of the control lever. The second displacement transmission mechanism mechanically links the additional operational mechanism and the control lever without interposing the first displacement transmission mechanism to shift the control lever in accordance with an operation of the additional operational mechanism.

20 Claims, 13 Drawing Sheets

(51) Int. Cl.

| | |
|---|---|
| ***B62D 33/06*** | (2006.01) |
| ***F16H 21/52*** | (2006.01) |
| ***G05G 1/04*** | (2006.01) |
| ***G05G 1/08*** | (2006.01) |

(52) U.S. Cl.

CPC ..... *B62D 33/0617* (2013.01); *B62D 49/0671* (2013.01); *F16H 21/52* (2013.01); *G05G 1/04* (2013.01); *G05G 1/08* (2013.01)

(56) References Cited

U.S. PATENT DOCUMENTS

| | | | | |
|---|---|---|---|---|
| 5,120,187 | A * | 6/1992 | Weber .................... | G05G 11/00 172/432 |
| 6,030,169 | A * | 2/2000 | Rossow ................. | B60K 28/04 414/680 |
| 6,935,434 | B1 | 8/2005 | Easton et al. | |
| 7,798,241 | B2 | 9/2010 | Muzzy et al. | |
| 9,050,890 | B2 * | 6/2015 | Buerkle ................... | B60D 1/36 |
| 9,989,986 | B2 | 6/2018 | Foster et al. | |
| 2013/0264139 | A1 * | 10/2013 | Braun .................... | G09B 9/042 180/322 |

FOREIGN PATENT DOCUMENTS

| | | |
|---|---|---|
| EP | 0442279 | 8/1991 |
| GB | 1036774 | 7/1966 |
| JP | 58-24107 | 2/1983 |
| JP | 62-22502 | 1/1987 |

* cited by examiner

WORK VEHICLE

CROSS-REFERENCE TO RELATED APPLICATIONS

The present application claims priority under 35 U. S. C. § 119 to Japanese Patent Application No. 2019-234515, filed Dec. 25, 2019, and Japanese Patent Application No. 2019-234516, filed Dec. 25, 2019. The contents of these applications are incorporated herein by reference in their entirety.

BACKGROUND OF THE INVENTION

Field of the Invention

The present application discloses technology related to a work vehicle.

Discussion of the Background

There has been known a work vehicle having an operational mechanism to operate a link mechanism to be equipped with a work implement. U.S. Pat. No. 7,798,241 describes a displacement transmission mechanism linking a control lever and a hydraulic valve in a hydraulic circuit to actuate the link mechanism. U.S. Pat. No. 6,935,434 describes a work vehicle in which a control lever and a switch are electrically connected to a controller and the controller is configured to control the hydraulic valve. U.S. Pat. No. 9,989,986 describes a work vehicle in which a dial disposed on a console is electrically connected to a controller and the controller is configured to control the hydraulic valve/pump in accordance with rotation of the dial.

SUMMARY OF THE INVENTION

According to one aspect of the present invention, a work vehicle includes a link mechanism, a drive mechanism, a control lever, a first displacement transmission mechanism, an additional operational mechanism, and a second displacement transmission mechanism. The link mechanism is to be equipped with a work implement. The drive mechanism is to drive the link mechanism to ascend and descend the work implement. The control lever is to be operated to ascend and descend the work implement. The first displacement transmission mechanism links the drive mechanism and the control lever to transmit a displacement of the control lever to the drive mechanism. The additional operational mechanism is configured to operate the control lever at a location apart from a position of the control lever. The second displacement transmission mechanism mechanically links the additional operational mechanism and the control lever without interposing the first displacement transmission mechanism to shift the control lever in accordance with an operation of the additional operational mechanism.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
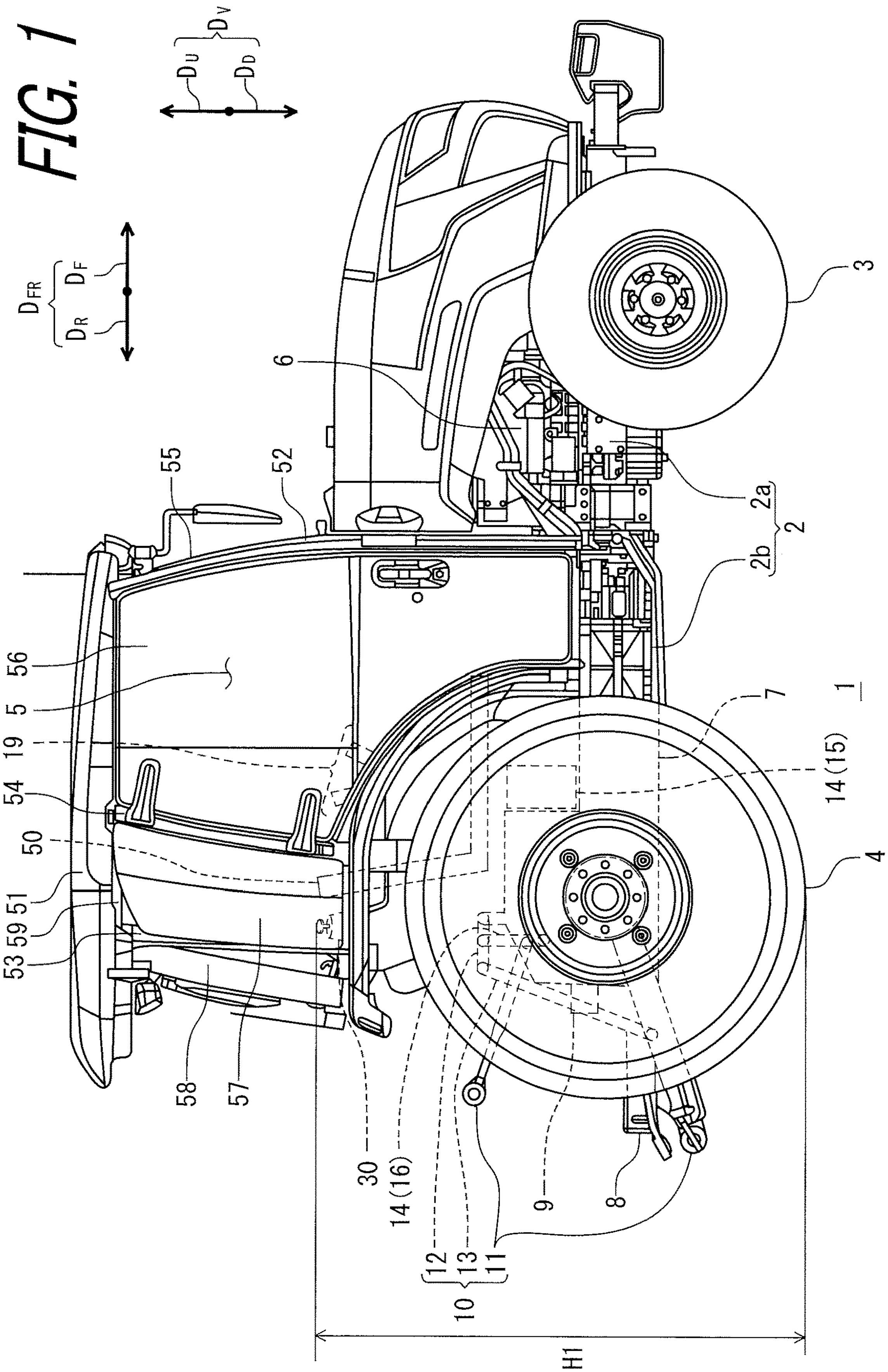
FIG. 1 is a side view of a work vehicle according to an embodiment.

Embodiments will now be described below with reference to the drawings. Same reference signs denote corresponding or identical configurations in the drawings.

First Embodiment

<Entire Configuration>

FIG. 1 is a side view of a work vehicle 1 according to the embodiment. Examples of the work vehicle 1 include an agricultural tractor. The work vehicle 1 includes a vehicle body frame 2, traveling wheels 3 and 4, and a cabin 5. The work vehicle 1 is preferably a four-wheel drive vehicle configured to rotate the four traveling wheels 3 and 4 to travel.

In the embodiments in the present application, a front-rear direction $D_{FR}$ indicates a front-rear direction viewed from an operator seated on a driver's seat 50 provided in the cabin 5. A left-right direction and a lateral direction indicate a left-right direction and a lateral direction viewed from the operator. A vertical direction $D_V$ indicates a vertical direction viewed from the operator. Assume that front-rear, left-right (lateral), and height directions of the work vehicle 1 match the front-rear, left-right (lateral), and vertical directions viewed from the operator, respectively.

The vehicle body frame 2 includes a front frame 2*a* and a rear frame 2*b*. The front frame 2*a* is provided with an engine 6. The rear frame 2*b* is provided with the cabin 5 and a transmission case 7. The transmission case 7 accommodates a travel gearbox configured to transmit drive power from the engine 6 to the traveling wheels 3 and 4, and the like. The transmission case 7 further accommodates a work implement gearbox configured to distribute motive power from the engine 6 to a work implement (not depicted) separately from the traveling wheels 3 and 4, a clutch, and the like. The work implement gearbox, the clutch, and the like constitute a motive power transmission system to be called a work transmission system.

The work vehicle 1 further includes a traction device 8, a power take-off shaft (PTO shaft) 9, and a link mechanism 10. The traction device 8 includes a convey carrier (not depicted) coupled to a rear end of the work vehicle 1 for conveyance. The power take-off shaft 9 (the PTO shaft 9) is to output motive power to drive the work implement. The link mechanism 10 includes a three-point lifting mechanism 11 to be equipped with the work implement (not depicted) like a rotary tillage device, and lift arms 12 and lift rods 13 that are to ascend and descend the three-point lifting mechanism 11. That is, the link mechanism 10 is to be equipped with the work implement. The lift arms 12 are each configured to swing upward and downward along with operation of hydraulic cylinders 16 included in the work transmission system. The lift arms 12, the lift rods 13, and the hydraulic cylinders 16 are provided respectively on right and left sides of the work vehicle 1 one by one. The PTO shaft 9 is connected to a transmission shaft for transmission of the motive power to the work implement (not depicted). Here, the work transmission system (the work vehicle 1) includes a drive mechanism 14 to drive the link mechanism 10 to ascend and descend the work implement. The drive mechanism 14 includes the hydraulic cylinder 16.

<Internal Configuration of Cabin>

The cabin 5 is a space surrounded with a roof 51, front pillars 52, rear pillars 53, center pillars 54, a windshield 55, door panels 56, side windows 57, and a rear window 58. In other words, the cabin 5 is defined by the roof 51, the front pillar 52, the rear pillar 53, and the center pillar 54.

The roof 51 has an internal storage space for an air conditioner, a wireless communication device, and the like. The front pillar 52, the rear pillar 53, and the center pillar 54 supports the roof 51. More specifically, the work vehicle 1 has a roof support frame 59 linking a top of the front pillar 52, a top of the rear pillar 53, and a top of the center pillar 54, and the roof 51 is supported by the front pillar 52, the rear pillar 53, and the center pillar 54 via the roof support frame 59. The front pillar 52 is provided in front ($D_F$) of the link mechanism 10 in the front-rear direction $D_{FR}$ of the work vehicle 1. More specifically, the front pillar 52 is provided in front ($D_F$) of the driver's seat 50 in the front-rear direction $D_{FR}$. The rear pillar 53 is provided opposite to the front pillar 52 in the front-rear direction $D_{FR}$. The center pillar 54 is provided between the front pillar 52 and the rear pillar 53 in the front-rear direction $D_{FR}$. More specifically, the center pillar 54 is closer to the rear pillar 53 than to the front pillar 52 in the front-rear direction $D_{FR}$. The front pillars 52 support the windshield 55. The center pillars 54 supports the door panels 56. The rear pillars 53 support the side windows 57. The roof support frame 59 supports the rear window 58.

The windshield 55 is transparent and constitutes a front end of the cabin 5. The door panels 56 are transparent and are provided at right and left ends of the cabin 5. The door panels 56 are outwardly openable. Being outwardly openable indicates being openable to be distant from the driver's seat 50. The side windows 57 are transparent and are provided at right and left ends of the cabin 5 and behind ($D_R$) the door panels 56. The side windows 57 are also outwardly openable. The rear window 58 is transparent and constitutes a rear end of the cabin 5. The rear window 58 is also outwardly openable.

The work vehicle 1 includes a control lever 19 and an additional operational mechanism 30, which are disposed on the right of the driver's seat 50 in the cabin 5. That is, the work vehicle 1 further includes the cabin 5 accommodating the control lever 19 and the additional operational mechanism 30. The control lever 19 is to be operated to ascend and descend the work implement (not depicted). The control lever 19 is swingable in the front-rear direction $D_{FR}$. FIG. 1 illustrates the control lever 19 tilted forward and the control lever 19 tilted backward. With reference to FIG. 1, the control lever 19 is between the front pillar 52 and the center pillar 54 in the front-rear direction $D_{FR}$. When the control lever 19 is shifted to an ascending position, the link mechanism 10 ascend the work implement. When the control lever 19 is shifted to a descending position, the link mechanism 10 descend the work implement. When the control lever 19 is shifted to a neutral position, the link mechanism 10 stops ascending and descending the work implement. The ascending position, the descending position, and the neutral position are, for example, a position to which the control lever 19 is tilted forward (a forward position), a position to which the control lever is tilted backward (a backward position), and a middle position between the forward position and the backward position, respectively.

Figure 2:
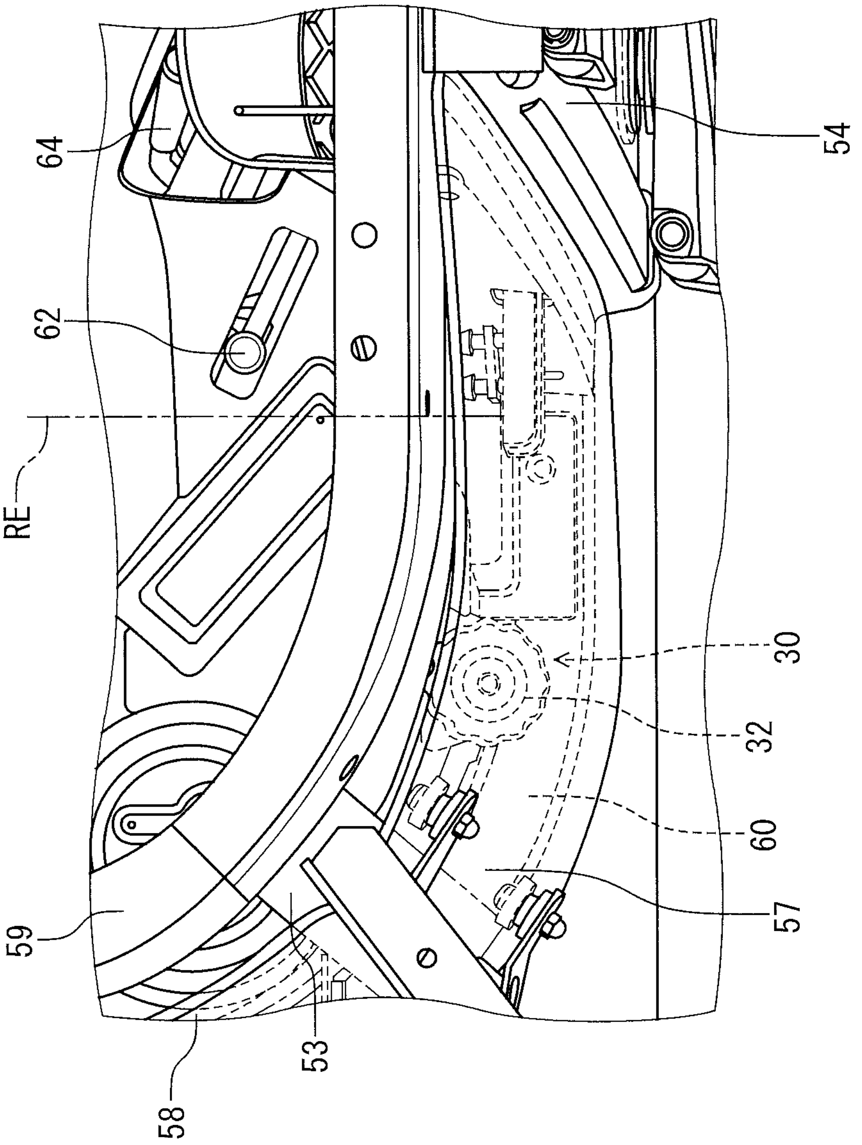
FIG. 2 is a plan view magnifying a vicinity of the additional operational mechanism.
Figure 3:
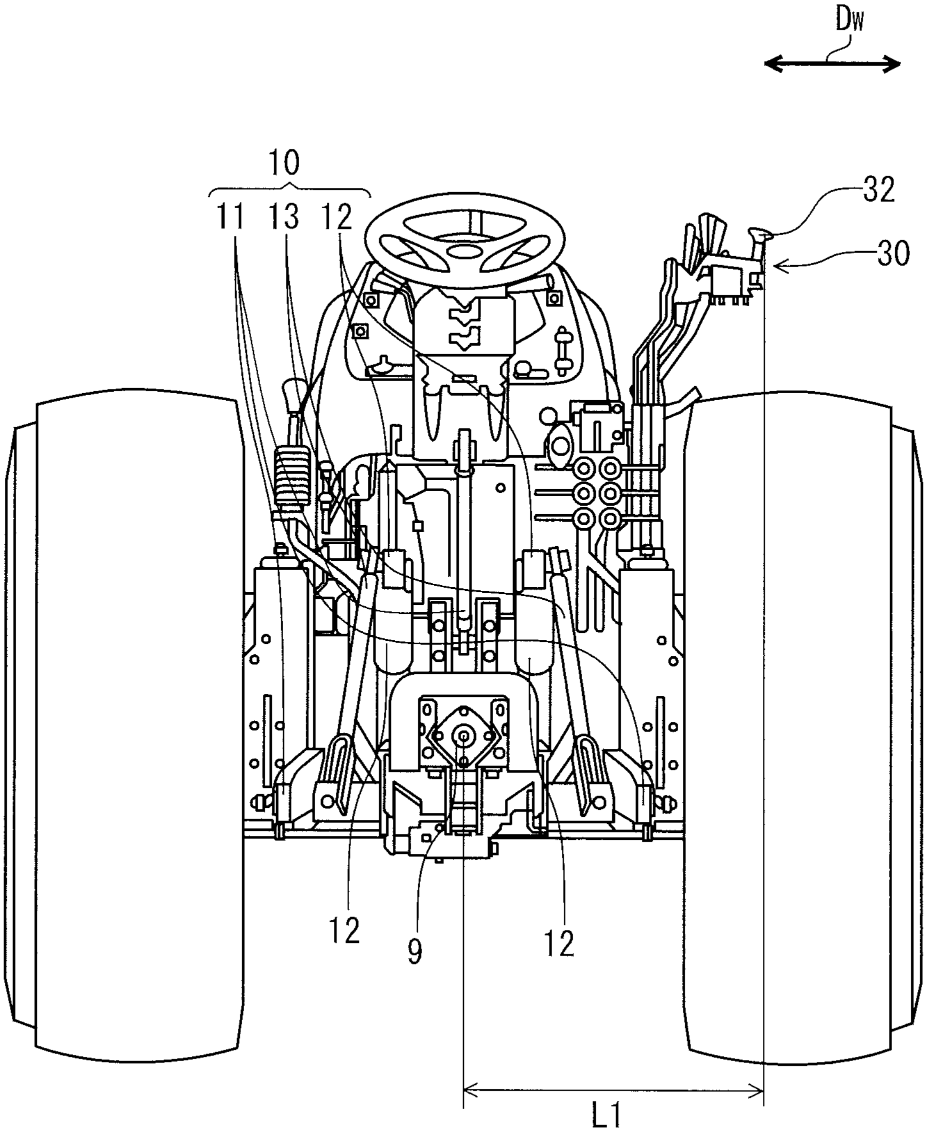
FIG. 3 is a rear view of the work vehicle which shows a position of the additional operational mechanism.

The additional operational mechanism 30 is configured to operate the control lever 19 at a location apart from a position of the control lever 19. The additional operational mechanism 30 is provided between the center pillar 54 and the rear pillar 53 in the front-rear direction $D_{FR}$. More specifically, the additional operational mechanism 30 is closer to the rear pillar 53 than to the center pillar 54 in the front-rear direction $D_{FR}$. FIG. 2 is a plan view magnifying a vicinity of the additional operational mechanism 30. As shown in FIG. 2, the additional operational mechanism 30 is provided adjacent to a window (the side window 57) of the cabin 5. As described above, the window is configured to be opened by an operator outside the cabin 5. Furthermore, as seen in the height direction (the vertical direction $D_V$) along a height of the work vehicle 1, the additional operational mechanism 30 overlaps with a base frame 60 linking a bottom of the front pillar 52, a bottom of the rear pillar 53, and a bottom of the center pillar 54. The additional operational mechanism 30 is used when an operator standing on the ground tests operation of the link mechanism 10. Furthermore, as shown in FIG. 1, in order to facilitate operation by an operator standing on the ground, it is preferable that a height H1 of the additional operational mechanism 30 from the ground on which the work vehicle 1 is provided is less than or equal to 1800 mm. FIG. 3 is a rear view of the work vehicle 1 which shows a position of the additional operational mechanism 30. With reference to FIG. 3, in order to secure the safety of the operator, it is preferable that a distance L1 between the power take off shaft (the PTO shaft) 9 and the additional operational mechanism 30 in a width direction $D_W$ (the lateral direction) along a width of the work vehicle 1 is at least 550 mm.

Figure 4:
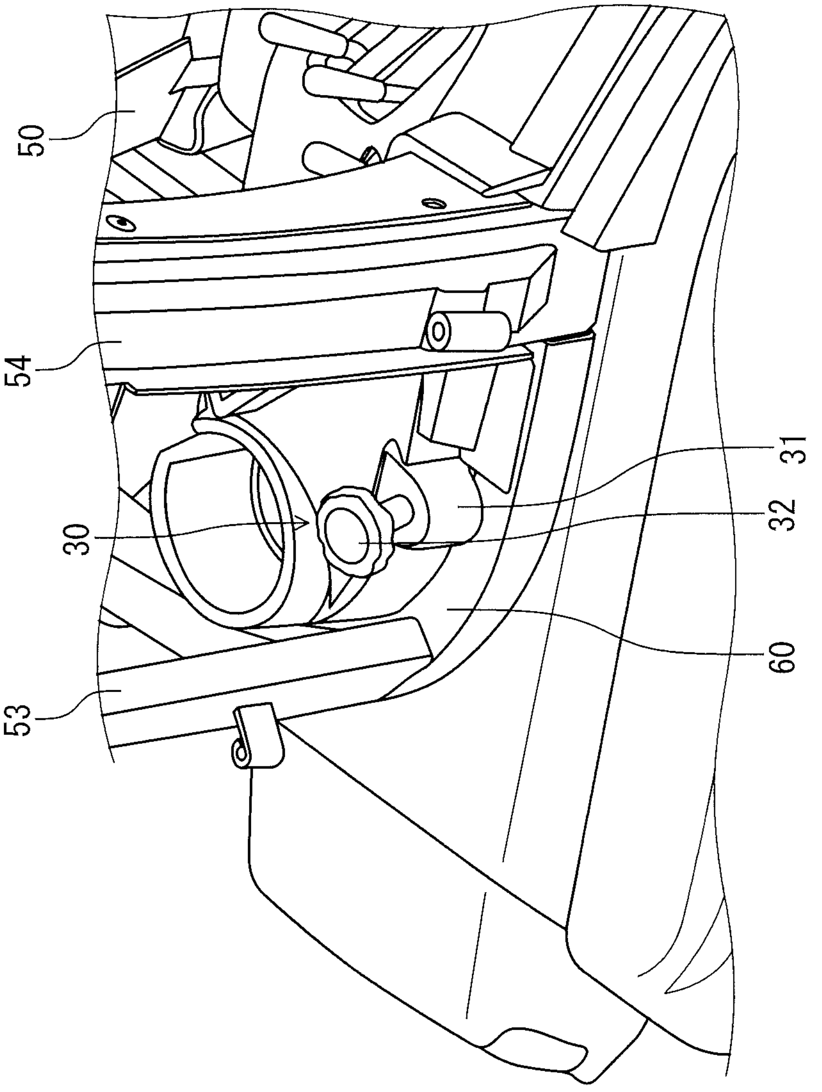
FIG. 4 is a perspective view magnifying the vicinity of the additional operational mechanism.
Figure 5:
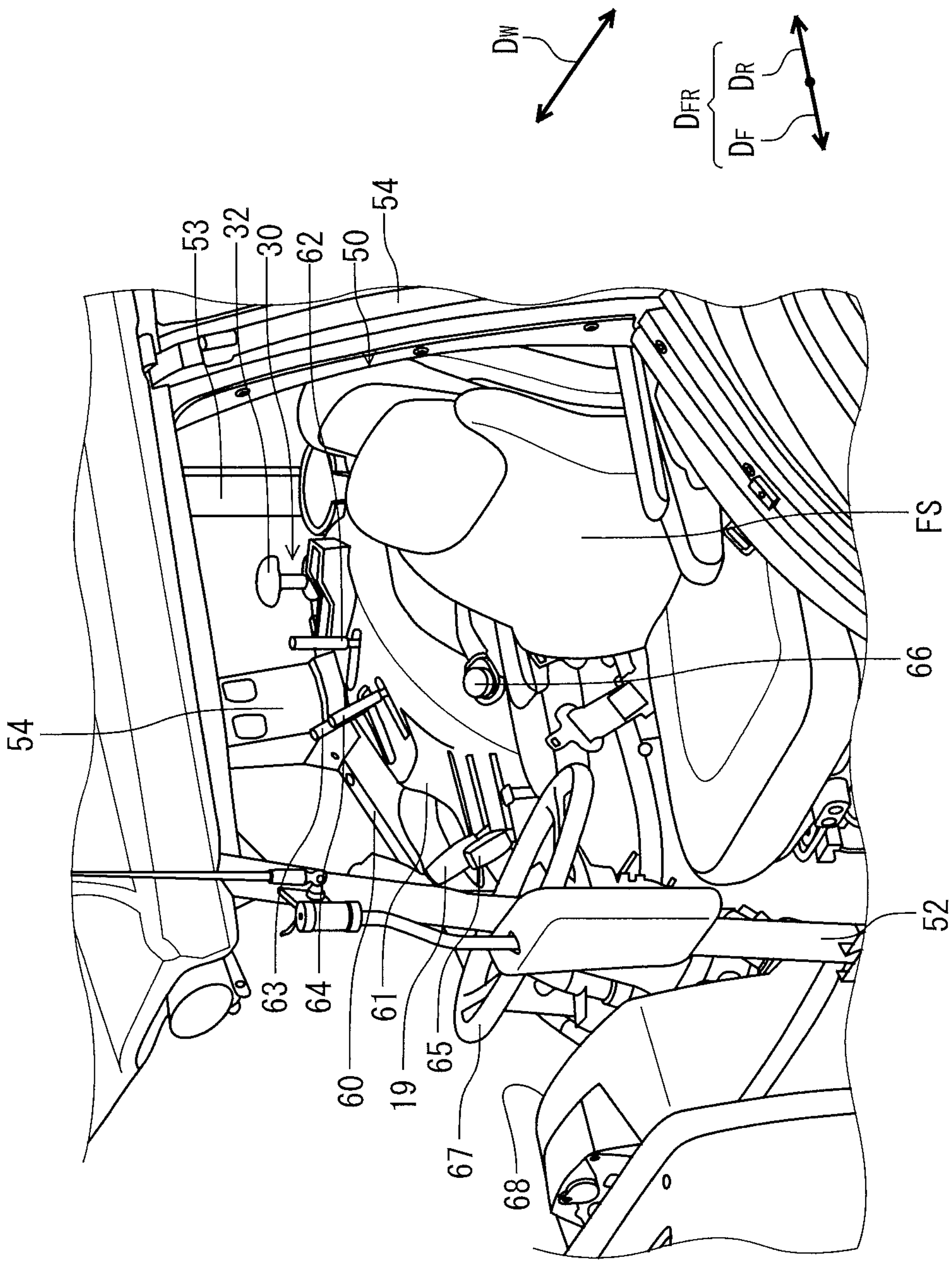
FIG. 5 is a perspective view of the interior of the cabin.

FIG. 4 is a perspective view magnifying the vicinity of the additional operational mechanism 30. FIG. 5 is a perspective view of the interior of the cabin 5. FIGS. 4 and 5 omit the windshield 55, the door panels 56, the side windows 57, and the rear window 58 from the drawings to enhance its visibility. With reference to FIGS. 2 and 4, an operational member 32 and a cover 31 among the additional operational mechanism 30 overlap with the base frame 60 as seen in the height direction, the operational member 32 being to be operated by the operator, the cover 31 covering parts of the additional operational mechanism 30 except for the operational member 32. The operational member 32 is a knob. The operator can shift the control lever 19 by rotating the knob.

With reference to FIG. 5, the work vehicle 1 has a console 61 between the driver's seat 50 and the base frame 60 in the width direction $D_W$ along the width of the work vehicle 1. The control lever 19 and the additional operational mechanism 30 are provided to the console 61. Other operational tools such as other control levers 62, 63, 64, 65 and an operational button 66 are provided to the console 61, but all operational tools that are provided to the console 61 except for the additional operational mechanism 30 are provided in front ($D_F$) of a rear end RE (See FIG. 2) of the center pillar 54. In other words, all operational tools except for the additional operational mechanism 30 are provided in front ($D_F$) of a front surface FS of a backrest of the driver's seat 50, whereas the additional operational mechanism 30 is provided behind ($D_R$) the front surface FS of the backrest of the driver's seat 50. For reference, FIG. 2 shows a front edge SE of the front surface FS of the backrest of the driver's seat 50. Accordingly, the operator can operate operational tools of the console 61 except for the additional operational mechanism 30 while the operator drives the work vehicle 1, but the operator cannot operate the additional operational mechanism 30 while the operator drives the work vehicle 1.

Furthermore, the work vehicle 1 further includes a steering wheel 67 and a control panel 68, which are disposed behind ($D_R$) the windshield 55 (the front pillar 52) and ahead ($D_F$) of the driver's seat 50, and includes, below them, a clutch pedal, a brake pedal, a speed control pedal, and the like, which are not depicted. The control panel 68 includes a display showing a current state of the work vehicle 1 and operational keys via which various settings of the work vehicle are conducted. The additional operational mechanism 30 is not provided at the control panel 68.

<Details of Mechanisms to Operate the Link Mechanism>

Figure 6:
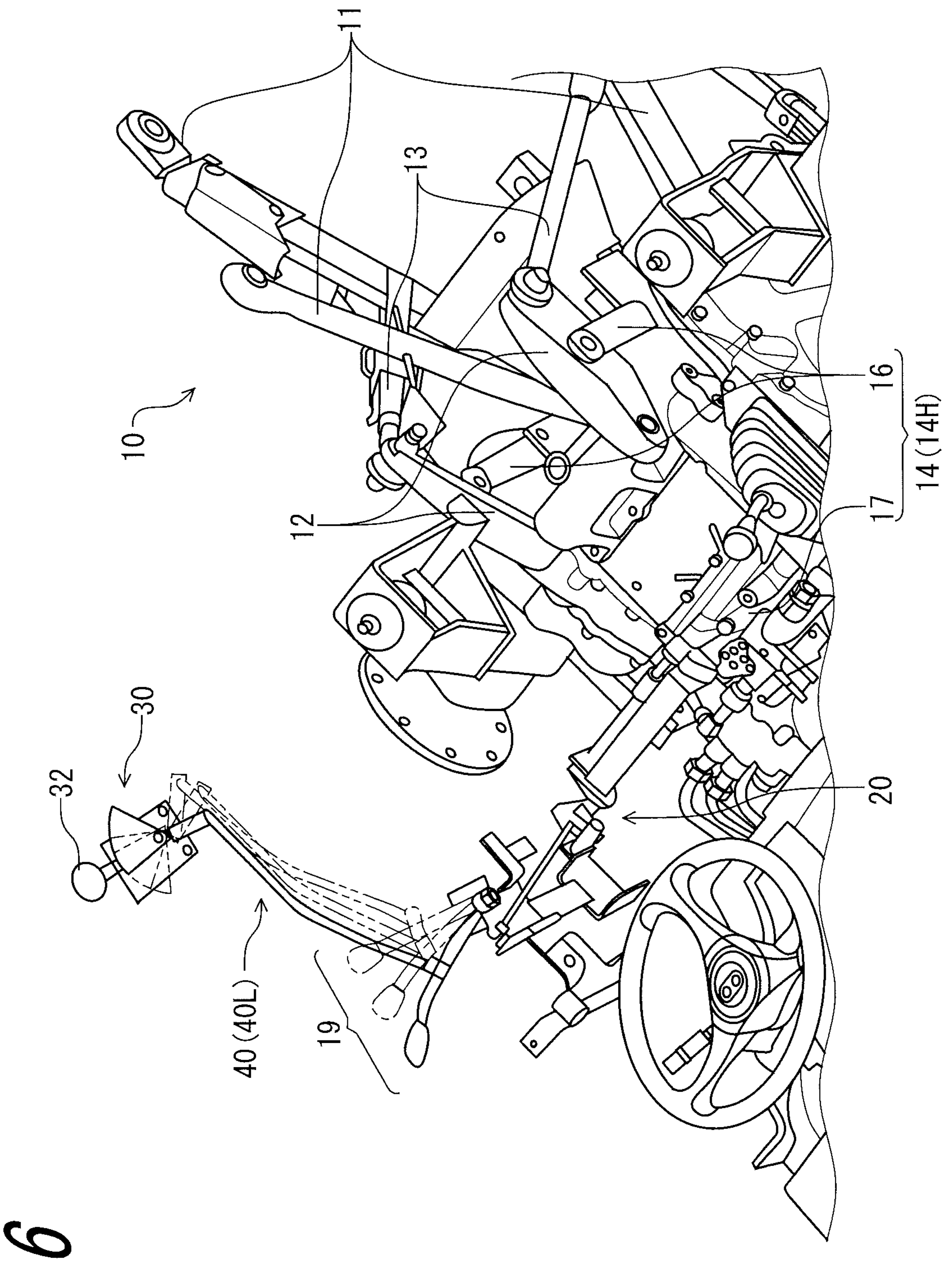
FIG. 6 is a perspective view illustrating mechanisms to operate the link mechanism.

FIG. 6 is a perspective view illustrating mechanisms to operate the link mechanism 10. With reference to FIG. 6, the work vehicle 1 includes a first displacement transmission mechanism 20 and a second displacement transmission mechanism 40. The first displacement transmission mechanism 20 links the control lever 19 and the drive mechanism 14 to transmit a displacement of the control lever 19 to the drive mechanism 14. The second displacement transmission mechanism 40 mechanically links the additional operational mechanism 30 and the control lever 19 without interposing the first displacement transmission mechanism 20 to shift the control lever 19 in accordance with an operation of the additional operational mechanism 30. In FIG. 6, multiple positions of the control lever 19 and states of the additional operational mechanism 30 corresponding to the positions of the control lever 19 are shown by solid lines and two-dot chain lines. The drive mechanism 14 is a hydraulic driving mechanism 14H including a hydraulic valve 17 and the hydraulic cylinder 16. Furthermore, the hydraulic driving mechanism 14H includes a hydraulic pump 15 to be driven by the engine 6 to discharge hydraulic oil (See FIG. 1) and oil passages (not depicted) that connect the hydraulic pump 15, the hydraulic cylinder 16, and the hydraulic valve 17.

Figure 7:
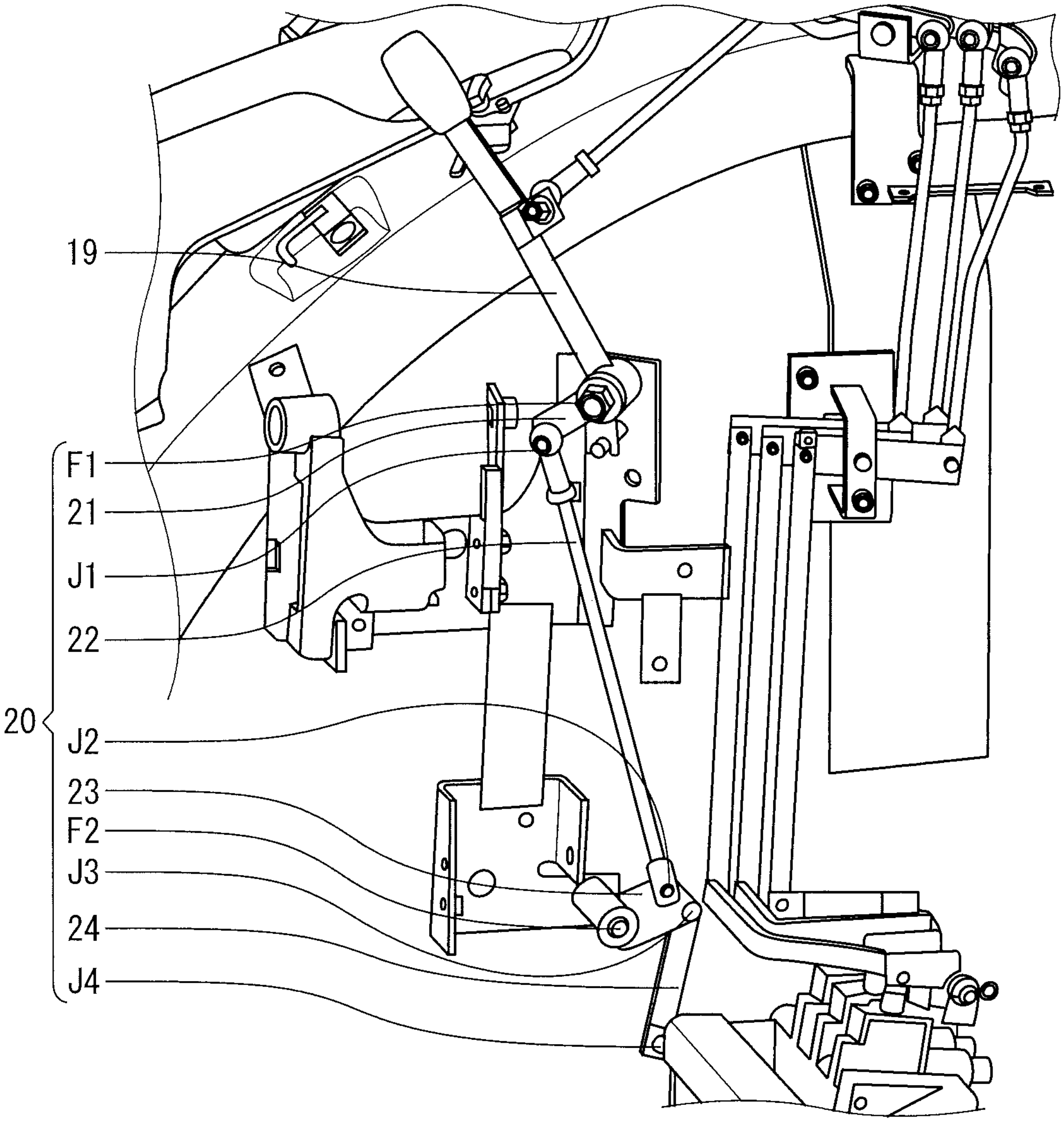
FIG. 7 is a partial enlarged view of the first displacement transmission mechanism.
Figure 8:
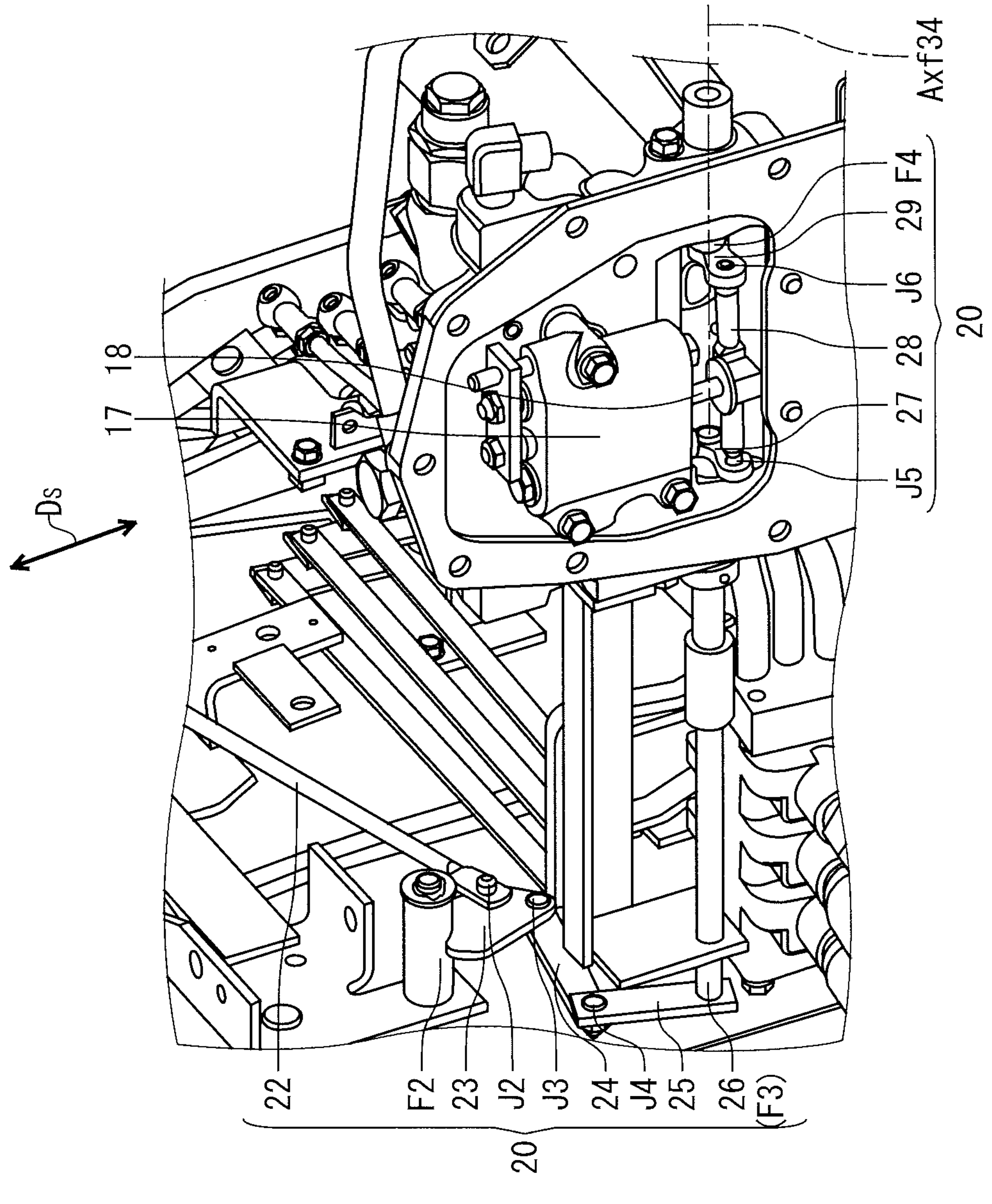
FIG. 8 is a partial enlarged view of the first displacement transmission mechanism.

FIGS. 7 and 8 are partial enlarged views illustrating the first displacement transmission mechanism 20. With reference to FIGS. 7 and 8, the first displacement transmission mechanism 20 is a linkage. With reference to FIG. 7, the first displacement transmission mechanism 20 includes a fulcrum F1, the control lever 19 being rotatable about the fulcrum F1. A fulcrum is a joint whose position is unchanged. Furthermore, the first displacement transmission mechanism 20 includes a follower 21 connected to the control lever 19 at the fulcrum F1 to be rotatable together with the control lever 19 about the fulcrum F1. With reference to FIGS. 7 and 8, the first displacement transmission mechanism 20 further includes a revolute joint J1, a link 22, a revolute joint J2, a link 23, a fulcrum F2, a revolute joint J3, a link 24, a revolute joint J4, a link 25, a shaft 26, a link 27, a revolute joint J5, a link 28, a revolute joint J6, a link 29, and a fulcrum F4. The shaft 26 constitutes a fulcrum F3. The shaft 26 and the fulcrum F4 is rotatable around a common rotational axis Axf34. A distance between the rotational axis Axf34 and the revolute joint J6 in a radial direction with respect to the rotational axis Axf34 is substantially equal to a distance between the rotational axis Axf34 and the revolute joint J6 in the radial direction.

The fulcrum F1, the follower 21, the revolute joint J1, the link 22, the revolute joint J2, the link 23, and the fulcrum F2 constitute a four-bar linkage. The fulcrum F2, the link 23, the revolute joint J3, the link 24, the revolute joint J4, the link 25, and the fulcrum F3 (the shaft 26) constitute a four-bar linkage. The fulcrum F3 (the shaft 26), the link 27, the revolute joint J5, the link 28, the revolute joint J6, the link 29, and the fulcrum F4 constitute a four-bar linkage. Accordingly, the link 28 is configured to rotate by the rotational axis Axf34 in accordance with the displacement of the control lever 19 which is transmitted to the follower 21. The hydraulic valve 17 has a spool 18 connected to the first displacement transmission mechanism 20, a position of the spool 18 changing in accordance with the displacement of the control lever 19. The spool 18 is connected to link 28 to move in a spool extending direction Ds in accordance with the rotation of the link 28. Specifically, the link 28 moves to positions in the spool extending direction Ds, which correspond to the ascending position, the neutral position, and the descending position, to move the spool 18 to the ascending position, the neutral position, and the descending position, respectively.

The hydraulic valve 17 is a three-position selector valve. When the spool 18 is moved to the ascending position, the hydraulic valve 17 rearranges the oil passages such that the pressured oil from the hydraulic pump 15 is transmitted to oil chambers of the hydraulic cylinders 16. Consequently, the hydraulic cylinders 16 as shown in FIG. 6 extend to push the three-point lifting mechanism 11 upward. When the spool 18 is moved to the descending position, the hydraulic valve 17 rearranges the oil passages such that the hydraulic oil is discharged from the oil chambers of the hydraulic cylinders 16. Consequently, the hydraulic cylinders 16 as shown in FIG. 6 contract, thereby the three-point lifting mechanism 11 descends. When the spool 18 is moved to the neutral position, the hydraulic valve 17 rearranges the oil passages such that oil amounts in the oil chambers of the hydraulic cylinders 16 are stable. Consequently, the three-point lifting mechanism 11 stops ascending and descending. That is, the hydraulic cylinder 16 is to extend and contract based on the position of the spool 18 to move the link mechanism 10. For reference, Japanese Unexamined Patent Application Publication No. S62-22502, Japanese Unexamined Utility Model (Registration) Application Publication No. S58-24107, etc. shows examples of such hydraulic circuit.

Figure 9:
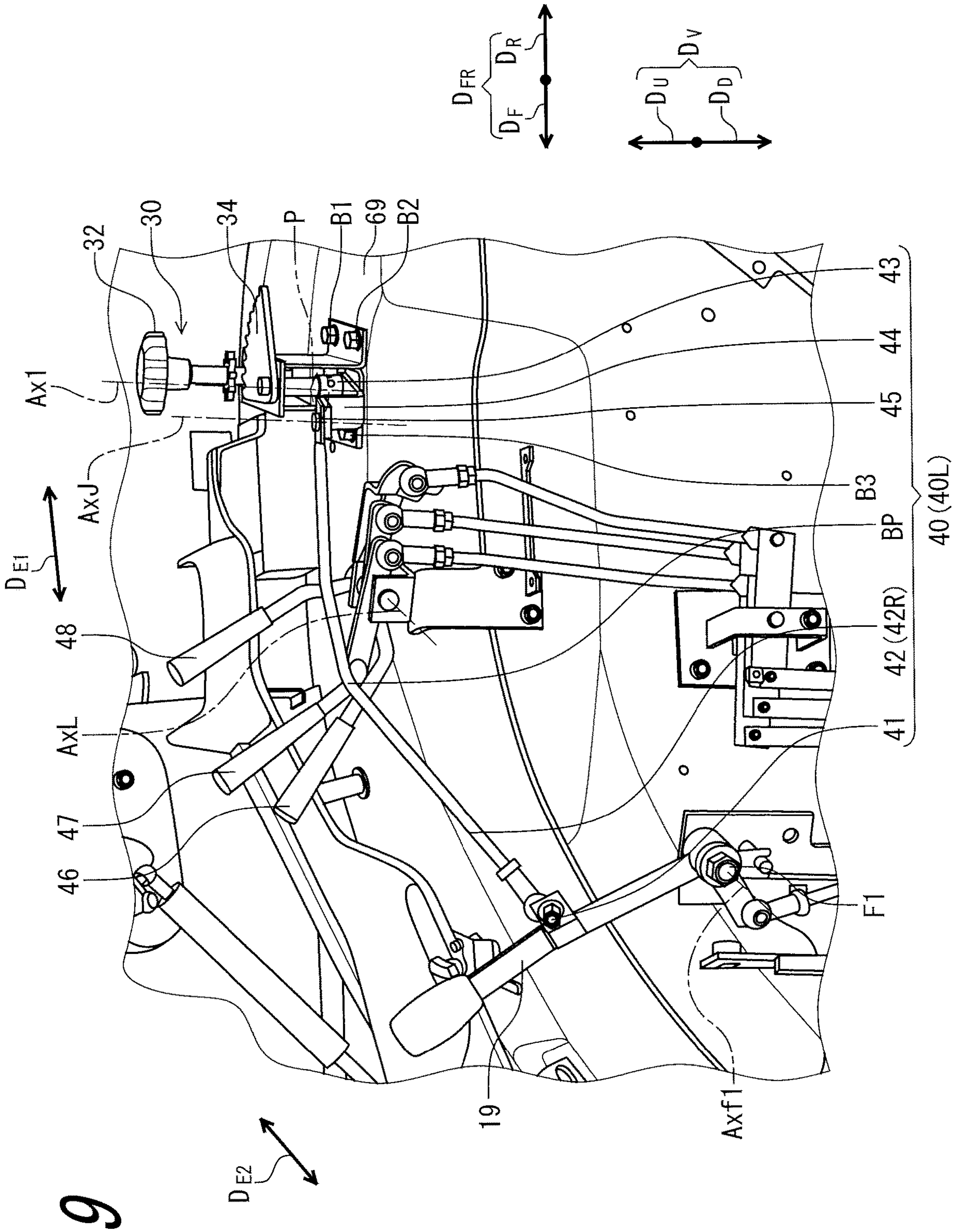
FIG. 9 is a front view of the second displacement transmission mechanism.
Figure 10:
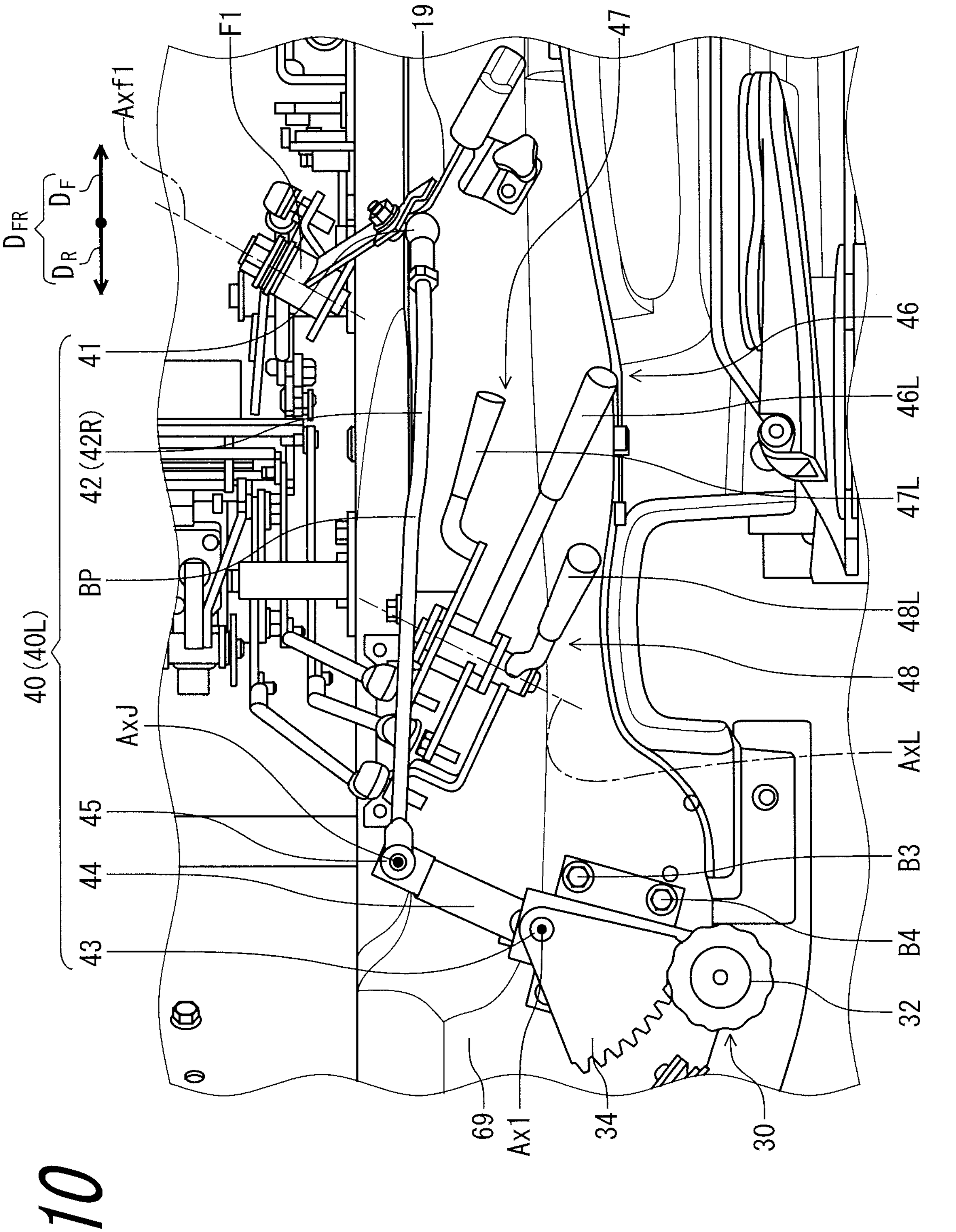
FIG. 10 is a top view of the second displacement transmission mechanism.

Next, the second displacement transmission mechanism 40 is described. FIG. 9 is a front view of the second displacement transmission mechanism 40. FIG. 10 is a top view of the second displacement transmission mechanism 40. FIGS. 9 and 10 omit the cover 31 from the drawings for convenience of explanation. With reference to FIGS. 9 and 10, the second displacement transmission mechanism 40 is a linkage 40L. The linkage 40L includes a first intermediate joint 41 and a coupler link 42. The linkage 40L further includes a base joint 43, a crank 44, and a second intermediate joint 45.

The first intermediate joint 41 is connected to the control lever 19. The first intermediate joint 41 is different from the fulcrum F1. The coupler link 42 is connected to the first intermediate joint 41 to be rotatable about the first intermediate joint 41. The base joint 43 is connected to the additional operational mechanism 30 to be rotated by the additional operational mechanism 30 around a first rotational axis Ax1. The base joint 43 constitutes a fulcrum. The structure of the base joint 43 is described in detail hereinafter. The crank 44 is connected to the base joint 43 to be rotatable together with the base joint 43 around the first rotational axis Ax1. The second intermediate joint 45 links the coupler link 42 and the crank 44. The coupler link 42 is rotatable about the second intermediate joint 45 with respect to the crank 44.

The fulcrum F1 has a fulcrum rotational axis Axf1 non-parallel to the first rotational axis Ax1. At least one of the first intermediate joint 41 and the second intermediate joint 45 is a ball joint. Specifically, the first intermediate joint 41 is a ball joint. Accordingly, it is possible to configure a four-bar linkage between two fulcrums (the base joint 43, the fulcrum F1) whose rotational axes are non-parallel to each other.

Figure 11:
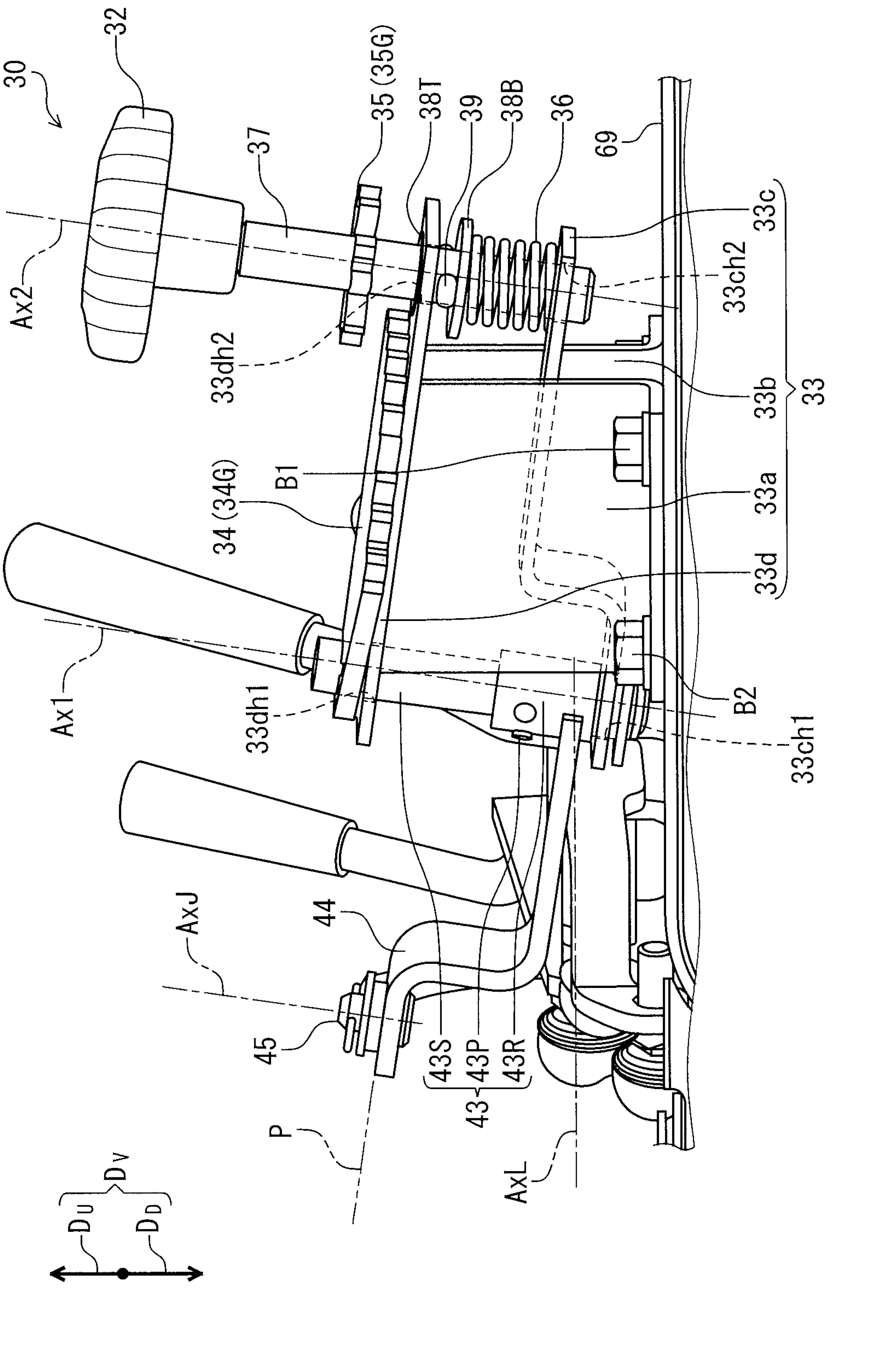
FIG. 11 is a side view of the additional operational mechanism.

The coupler link 42 is a rod 42R that bends so as not to interfere with another operational mechanism (any one of 46, 47 and 48) between the control lever 19 and the additional operational mechanism 30. Specifically, the other operational mechanism (any one of 46, 47 and 48) includes a lever (any one of 46L, 47L and 48L) rotatable around a lever rotational axis AxL. As shown in FIG. 11, the second intermediate joint 45 is movable on a plane P that is higher than the lever rotational axis AxL in the height direction (the vertical direction $D_V$) along the height of the work vehicle 1 and is rotatable around a joint rotational axis AxJ that is substantially parallel to the plane P. As shown in FIGS. 9 and 10, the rod 42R has a bending point BP between the lever rotational axis AxL and the first intermediate joint 41 in the front-rear direction $D_{FR}$ of the work vehicle 1. As shown in FIG. 9, the rod 42R extends from the second intermediate joint 45 to the bending point BP in a first extending direction $D_{E1}$ such that the rod 42R is provided above ($D_U$) the lever rotational axis AxL in the height direction (the vertical direction $D_V$) and extends from the bending point BP to the first intermediate joint 41 in a second extending direction $D_{E2}$ slanted from the first extending direction $D_{E1}$, downward ($D_D$) in the height direction (the vertical direction $D_V$). In this embodiment, the joint rotational axis AxJ is substantially parallel to the first rotational axis Ax1. However, the joint rotational axis AxJ may be non-parallel to the first rotational axis Ax1.

<Details of Additional Operational Mechanism>

Next, details of the additional operational mechanism 30 are described.

Figure 12:
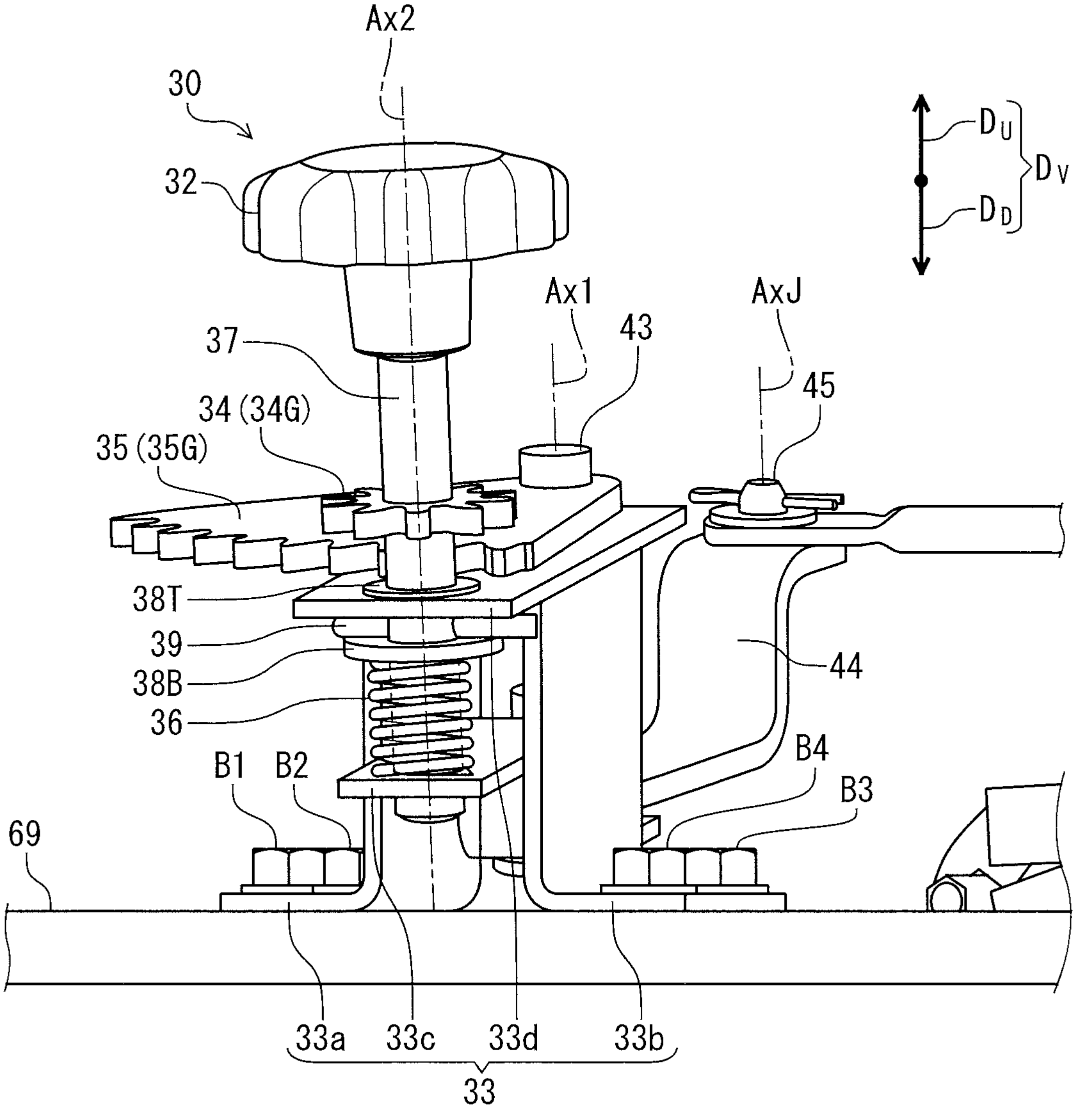
FIG. 12 is a front view of the additional operational mechanism.

FIG. 11 is a side view of the additional operational mechanism 30. FIG. 12 is a front view of the additional operational mechanism 30. FIGS. 11 and 12 omit the cover 31 from the drawings for convenience of explanation. With reference to FIGS. 11 and 12, the additional operational mechanism 30 includes a base 33. The base 33 is fixed, via bolts B1 to B4, to a fender frame 69 that is connected to the base frame 60. The base 33 includes a first L-shaped metal plate 33*a*, a second L-shaped metal plate 33*b*, a bottom plate 33*c*, and a top plate 33*d*. The first L-shaped metal plate 33*a* and the second L-shaped metal plate 33*b* face with each other. The bottom plate 33*c* and the top plate 33*d* are provided between the first L-shaped metal plate 33*a* and the second L-shaped metal plate 33*b*. The top plate 33*d* is provided above ($D_U$) the bottom plate 33*c*. The bottom plate 33*c* and the top plate 33*d* are fixed to the first L-shaped metal plate 33*a* and the second L-shaped metal plate 33*b* by welding.

The bottom plate 33*c* has a first bottom plate through hole 33*ch*1 and a second bottom plate through hole 33*ch*2 on its both ends in its longitudinal direction. The top plate 33*d* has a first top plate through hole 33*dh*1 and a second top plate through hole 33*dh*2 on its both ends in its longitudinal direction. The first top plate through hole 33*dh*1 is opposite to the first bottom plate through hole 33*ch*1 in an axial direction $D_{AX1}$ along the first rotational axis Ax1. The first rotational axis Ax1 passes through the first top plate through hole 33*dh*1 and the first bottom plate through hole 33*ch*1. The bottom plate 33*c* bends such that a distance between the first top plate through hole 33*dh*1 and the first bottom plate through hole 33*ch*1 in the axial direction $D_{AX1}$ is longer than a distance between the second top plate through hole 33*dh*2 and the second bottom plate through hole 33*ch*2 in the axial direction $D_{AX1}$.

The base joint 43 passes through the first top plate through hole 33*dh*1 and the first bottom plate through hole 33*ch*1. As shown in FIG. 11, the base joint 43 includes a shaft 43S, a ring 43R, and a pin 43P. The crank 44 is fixed to the ring 43R. The ring 43R is fixed to the shaft 43S via the pin 43P. The crank 44 bends such that the second intermediate joint 45 is above ($D_U$) the ring 43R. The first rotational axis Ax1 is a central axis of the shaft 43S. The shaft 43S is configured to rotate around the first rotational axis Ax1 with sliding on a wall surface of the first top plate through hole 33*dh*1 and on a wall surface of the first bottom plate through hole 33*ch*1.

The additional operational mechanism 30 includes the operational member 32 and the first rotational axis Ax1, which are described above, and includes a second rotational axis Ax2, a first engagement member 34, a second engagement member 35, and an urging member 36. The first engagement member 34 and the second engagement member 35 are gears. More specifically, the first engagement member 34 is a sector gear, and the second engagement member 35 is a spur gear. Thus, the first engagement member 34 and the second engagement member 35 can be referred to as a first gear 34G and a second gear 35G, respectively. Hence, the additional operational mechanism 30 includes the first gear 34G, the second gear 35G, and the operational member 32. The first engagement member 34 (the first gear 34G) is fixed to the shaft 43S by press-fitting. The first engagement member 34 (the first gear 34G) is connected to the base joint 43 to rotate together with the base joint 43 around the first rotational axis Ax1. Thus, the first engagement member 34 (the first gear 34G) is mechanically connected to the control lever 19 and rotatable around the first rotational axis Ax1 in accordance with a movement of the control lever 19. The first engagement member 34 (the first gear 34G) is made of metal plate.

The additional operational mechanism 30 further includes a shaft 37, an upper washer 38T, a lower washer 38B, and a retaining pin 39. The operational member 32 and the second engagement member 35 (the second gear 35G) are press-fitted to the shaft 37. Thereby, the operational member 32 is connected to the second engagement member 35 (the second gear 35G). The urging member 36 is a compression spring. The shaft 37 is attached to the base 33 by putting the shaft 37 through a through hole of the upper washer 38T, the second top plate through hole 33*dh*2, a through hole of the lower washer 38B, a through hole of the urging member 36, and the second bottom plate through hole 33*ch*2 in this order and by attaching the retaining pin 39 to the shaft 37 between the second top plate through hole 33*dh*2 and the lower washer 38B. The second rotational axis Ax2 is a central axis of the shaft 37. The second rotational axis Ax2 is substantially parallel to the first rotational axis Ax1. The second top plate through hole 33*dh*2 is opposite to the second bottom plate through hole 33*ch*2 in an axial direction $D_{AX2}$ along the second rotational axis Ax2. The second rotational axis Ax2 passes through the second top plate through hole 33*dh*2 and the second bottom plate through hole 33*ch*2.

The shaft 37 is slidable in the axial direction $D_{AX2}$ of the second rotational axis Ax2 on a wall surface of the second top plate through hole 33*dh*2 and on a wall surface of the second bottom plate through hole 33*ch*2. Accordingly, the operational member 32 is slidable in the axial direction $D_{AX2}$ of the second rotational axis Ax2, and the second engagement member 35 (the second gear 35G) is slidable together with the operational member 32 in the axial direction $D_{AX2}$. The shaft 37 is configured to rotate around the second rotational axis Ax2 with sliding on the wall surface of the second top plate through hole 33*dh*2 and on the wall surface of the second bottom plate through hole 33*ch*2. Accordingly, the operational member 32 and the second engagement member 35 (the second gear 35G) is rotatable around the second rotational axis Ax2. With reference to FIGS. 4 and 11, the second rotational axis Ax2 extends in a direction slanted toward the window (the side window 57) from the height direction (the vertical direction $D_V$) along the height of the work vehicle 1. Accordingly, it is easy for the operator outside the cabin 5 to push and rotate the operational member 32.

The second engagement member 35 (the second gear 35G) is engageable with the first engagement member 34 (the first gear 34G). The urging member 36 is to separate the second engagement member 35 (the second gear 35G) from the first engagement member 34 (the first gear 34G) in the axial direction $D_{AX2}$ so that the second engagement member 35 (the second gear 35G) does not engage with the first engagement member 34 (the first gear 34G). Specifically, the urging member 36 is to push the second engagement member 35 (the second gear 35G) upward ($D_U$) via the lower washer 38B, the retaining pin 39, and the shaft 37.

The operational member 32 is to be pushed by the operator to engage the second engagement member 35 (the second gear 35G) with the first engagement member 34 (the first gear 34G). When the operational member 32 is pushed by the operator, the upper washer 38T is to abut against the second engagement member 35 (the second gear 35G) to align the second engagement member 35 (the second gear 35G) with the first engagement member 34 (the first gear 34G). The operational member 32 is configured to be rotated by the operator to rotate the second engagement member 35 (the second gear 35G) and the first engagement member 34 (the first gear 34G) to shift the control lever 19. Thus, the second engagement member 35 (the second gear 35G) is configured to engage with the first engagement member 34 (the first gear 34G) to rotate the first engagement member 34 (the first gear 34G).

<Advantageous Effects of the Work Vehicle According to the Present Embodiment>

The work vehicle 1 according to the embodiment has the following advantageous effects.

In the work vehicle 1, the second displacement transmission mechanism 40 mechanically links the additional operational mechanism 30 and the control lever 19 without interposing the first displacement transmission mechanism 20 to shift the control lever 19 in accordance with an operation of the additional operational mechanism 30. Accordingly, it is not necessary to change the first displacement transmission mechanism 20. Accordingly, it is possible to operate the link mechanism 10 to be equipped with the work implement with a simple mechanism provided in a location other than a position of the control lever 19.

The work vehicle 1 includes the urging member 36 to separate the second engagement member 35 from the first engagement member 34 in the axial direction $D_{AX2}$ so that the second engagement member 35 does not engage with the first engagement member 34. Accordingly, the operational member 32 is stationary while an operator sitting on the driver's seat operates the control lever 19.

In more detail, in accordance with a first aspect of the present embodiment, a work vehicle includes a link mechanism, a drive mechanism, a control lever, a first displacement transmission mechanism, an additional operational mechanism, and a second displacement transmission mechanism. The link mechanism is to be equipped with a work implement. The drive mechanism is to drive the link mechanism to ascend and descend the work implement. The control lever is to be operated to ascend and descend the work implement. The first displacement transmission mechanism links the drive mechanism and the control lever to transmit a displacement of the control lever to the drive mechanism. The additional operational mechanism is configured to operate the control lever at a location apart from a position of the control lever. The second displacement transmission mechanism mechanically links the additional operational mechanism and the control lever without interposing the first displacement transmission mechanism to shift the control lever in accordance with an operation of the additional operational mechanism.

In accordance with a second aspect of the present disclosure, the work vehicle according to the first aspect is configured so that the second displacement transmission is a linkage.

In accordance with a third aspect of the present disclosure, the work vehicle according to the second aspect is configured so that the first displacement transmission mechanism includes a fulcrum, the control lever being rotatable about the fulcrum, and that the linkage includes a first intermediate joint connected to the control lever, the first intermediate joint being different from the fulcrum, and a coupler link connected to the first intermediate joint to be rotatable about the first intermediate joint.

In accordance with a fourth aspect of the present disclosure, the work vehicle according to the third aspect is configured so that the first displacement transmission mechanism includes a follower connected to the control lever at the fulcrum to be rotatable together with the control lever about the fulcrum.

In accordance with a fifth aspect of the present disclosure, the work vehicle according to the third or fourth aspect is configured so that the linkage further includes a base joint connected to the additional operational mechanism to be rotated by the additional operational mechanism around a first rotational axis, a crank connected to the base joint to be rotatable together with the base joint around the first rotational axis, and a second intermediate joint linking the coupler link and the crank, the coupler link being rotatable about the second intermediate joint with respect to the crank.

In accordance with a sixth aspect of the present disclosure, the work vehicle according to the fifth aspect is configured so that the fulcrum has a fulcrum rotational axis non-parallel to the first rotational axis. At least one of the first intermediate joint and the second intermediate joint is a ball joint.

In accordance with a seventh aspect of the present disclosure, the work vehicle according to the sixth aspect is configured so that the coupler link is a rod that bends so as not to interfere with another operational mechanism between the control lever and the additional operational mechanism.

In accordance with an eighth aspect of the present disclosure, the work vehicle according to the seventh aspect is configured so that the another operational mechanism includes a lever rotatable around a lever rotational axis. The second intermediate joint is movable on a plane that is higher than the lever rotational axis in a height direction along a height of the work vehicle and is rotatable around a joint rotational axis that is substantially parallel to the plane. The first intermediate joint is a ball joint. The rod has a bending point between the lever rotational axis and the first intermediate joint in a front-rear direction of the work vehicle. The rod extends from the second intermediate joint to the bending point in a first extending direction such that the rod is provided above the lever rotational axis in the height direction and extends from the bending point to the first intermediate joint in a second extending direction slanted from the first extending direction, downward in the height direction.

In accordance with a ninth aspect of the present disclosure, the work vehicle according to any one of the first to eighth aspects is configured so that the additional operational mechanism includes a first rotational axis, a second rotational axis, a first engagement member, an operational member, a second engagement member, and an urging member. The first engagement member is mechanically connected to the control lever and rotatable around the first rotational axis in accordance with a movement of the control lever. The operational member is slidable in an axial direction of the first rotational axis to be operated by an operator. The second engagement member is slidable together with the operational member and rotatable around the second rotational axis, the second engagement member being configured to engage with the first engagement member to rotate the first engagement member. The urging member is to separate the second engagement member from the first engagement member in the axial direction so that the second engagement member does not engage with the first engagement member.

In accordance with a tenth aspect of the present disclosure, the work vehicle according to the ninth aspect is configured so that the operational member is connected to the second engagement member to be pushed by the operator to engage the second engagement member with the first engagement member, the operational member being configured to be rotated by the operator to rotate the second engagement member and the first engagement member to shift the control lever.

In accordance with an eleventh aspect of the present disclosure, the work vehicle according to the tenth aspect is configured so that the operational member is a knob.

In accordance with a twelfth aspect of the present disclosure, the work vehicle according to any one of the ninth to eleventh aspects is configured so that the first engagement member and the second engagement member are gears.

In accordance with a thirteenth aspect of the present disclosure, the work vehicle according to the twelfth aspect is configured so that the first engagement member is made of metal plate.

In accordance with a fourteenth aspect of the present disclosure, the work vehicle according to any one of the ninth to thirteenth aspects is configured so that the second rotational axis is substantially parallel to the first rotational axis.

In accordance with a fifteenth aspect of the present disclosure, the work vehicle according to any one of the ninth to fourteenth aspects is configured so that the first engagement member has an engaging hole and that the second engagement member has a pin to be inserted into the engaging hole when the second engagement member engages with the first engagement member.

In accordance with a sixteenth aspect of the present disclosure, the work vehicle according to the fifteenth aspect is configured so that the second rotational axis is substantially coaxial with the first rotational axis.

In accordance with a seventeenth aspect of the present disclosure, the work vehicle according to any one of the first to sixteenth aspects further includes a cabin accommodating the control lever and the additional operational mechanism. The additional operational mechanism is provided adjacent to a window of the cabin. The window being configured to be opened by an operator outside the cabin.

In accordance with an eighteenth aspect of the present disclosure, the work vehicle according to the seventeenth aspect is configured so that the second rotational axis extends in a direction slanted toward the window from a height direction of the work vehicle.

In accordance with a nineteenth aspect of the present disclosure, the work vehicle according to the seventeenth or eighteenth aspect is configured so that the cabin is defined by a roof, a front pillar, a rear pillar, and a center pillar. The front pillar, the rear pillar, and the center pillar support the roof, the front pillar being provided in front of the link mechanism in a front-rear direction of the work vehicle, the rear pillar being provided opposite to the front pillar in the front-rear direction, the center pillar being provided between the front pillar and the rear pillar in the front-rear direction. The control lever is between the front pillar and the center pillar in the front-rear direction. The additional operational mechanism is provided between the center pillar and the rear pillar in the front-rear direction.

In accordance with a twentieth aspect of the present disclosure, the work vehicle according to the nineteenth aspect is configured so that the additional operational mechanism overlaps, as viewed in a height direction along a height of the work vehicle, with a base frame linking a bottom of the front pillar, a bottom of the rear pillar, and a bottom of the center pillar.

In accordance with a twenty-first aspect of the present disclosure, the work vehicle according to the nineteenth or twentieth aspect has, between a driver's seat and the base frame in a width direction along a width of the work vehicle, a console to which the control lever and the additional operational mechanism are provided. All operational tools that are provided to the console except for the additional operational mechanism are provided in front of a rear end of the center pillar.

In accordance with a twenty-second aspect of the present disclosure, the work vehicle according to any one of the first to twenty-first aspects is configured so that a height of the additional operational mechanism from a ground on which the work vehicle is provided is less than or equal to 1800 mm.

In accordance with a twenty-third aspect of the present disclosure, the work vehicle according to any one of the first to twenty-second aspects further includes a power take-off shaft to output motive power to drive the work implement. A distance between the power take off shaft and the additional operational mechanism in a width direction along a width of the work vehicle is at least 550 mm.

In accordance with a twenty-fourth aspect of the present disclosure, the work vehicle according to any one of the first to twenty-third aspects is configured so that the drive mechanism is a hydraulic driving mechanism including a hydraulic valve having a spool and a hydraulic cylinder. The spool is connected to the first displacement transmission mechanism, and a position of the spool changes in accordance with the displacement of the control lever. The hydraulic cylinder is to extend and contract based on the position of the spool to move the link mechanism.

The technology disclosed in the present application, more specifically, the work vehicle according to the first aspect is configured to be operated by the additional operational mechanism via the second displacement transmission mechanism without the first displacement transmission mechanism changed. Accordingly, it is possible to operate the link mechanism to be equipped with the work implement with a simple mechanism provided in a location other than a position of the control lever.

With the work vehicle according to the second aspect, it is possible to provide the second displacement transmission mechanism with saving a space in the console.

With the work vehicle according to the third aspect, the first intermediate joint is provided apart from the fulcrum. Accordingly, it is possible to shift the control lever even though force applied to the additional operational mechanism is small.

With the work vehicle according to the fourth aspect, the displacement of the control lever is transmitted via the follower.

With the work vehicle according to the fifth aspect, the fulcrum, the control lever, the first intermediate joint, the coupler link, the second intermediate joint, the crank, and the base joint constitute a four-bar linkage. Accordingly, the control lever is shifted by the operation of the additional operational mechanism.

With the work vehicle according to the sixth aspect, it is possible to set an extending direction of the first rotational axis independently of an extending direction of the fulcrum rotational axis.

With the work vehicle according to the seventh aspect, it is not necessary to change the another operational mechanism by adopting the bending rod. Accordingly, it can suppress increase of manufacturing cost of the work vehicle.

With the work vehicle according to the eighth aspect, the rod does not interfere with the another operational mechanism.

With the work vehicle according to the ninth aspect, since the second engagement member is to be separated from the first engagement member by the urging member, the first engagement member, which is rotatable in accordance with the movement of the control lever, does not engage with the second engagement member. Accordingly, the operational member is stationary while an operator sitting on the driver's seat operates the control lever.

With the work vehicle according to the tenth aspect, the operator can shift the control lever by rotating the operational member with pushing the operational member. Accordingly, the operation of the operator is easy.

The work vehicle according to the eleventh aspect facilitates the operator's operation of rotating the operational member.

With the work vehicle according to the twelfth aspect, it is possible to manufacture the first engagement member and the second engagement member with low cost.

With the work vehicle according to the thirteenth aspect, it is possible to manufacture the first engagement member with further low cost.

With the work vehicle according to the fourteenth aspect, since the first engagement member and the second engagement member can be spur gears, it is possible to manufacture the first engagement member and the second engagement member with further low cost.

With the work vehicle according to the fifteenth aspect, since the pin and the engaging hole are formed as an engagement portion of the first engagement member and the second engagement member, it is possible to manufacture the first engagement member and the second engagement member with low cost.

With the work vehicle according to the sixteenth aspect, since the second rotational axis is coaxial with the first rotational axis, the additional engagement member can be miniaturized.

With the work vehicle according to the seventeenth aspect, the additional operational mechanism is provided in the cabin, which facilitates prevention of the additional operational mechanism from being frozen.

With the work vehicle according to the eighteenth aspect, an operator outside the cabin can easily operate the operational member.

With the work vehicle according to the nineteenth aspect, the operator outside the cabin who operates the additional operational mechanism can easily visually recognize the link mechanism, whereas it would be difficult for an operator outside the cabin to visually recognize the link mechanism even if the operator could open a window adjacent to the control lever to operate the control lever.

With the work vehicle according to the twentieth aspect, the additional operational mechanism is provided closer to the window of the cabin, since the additional operational mechanism overlaps with the base frame. Accordingly, the operator outside the cabin can easily access the additional operational mechanism. Furthermore, it is possible to lengthen a distance between the power take off shaft and the additional operational mechanism in a width direction along a width of the work vehicle without enlarging the cabin in order to secure the safety of the operator outside the cabin who operates the additional operational mechanism.

With the work vehicle according to the twenty-first aspect, an operator sitting on the driver's seat can operate, while driving, all operational tools that are provided to the console except for the additional operational mechanism, whereas the additional operational mechanism is disposed in a location where the operator cannot operate the additional operational mechanism while driving.

With the work vehicle according to the twenty-second aspect, the operator outside the cabin can operate the additional operational mechanism without standing a platform.

With the work vehicle according to the twenty-third aspect, safety of the operator outside the cabin who operates the additional operational mechanism is secured.

With the work vehicle according to the twenty-fourth aspect, the drive mechanism can be realized by a hydraulic circuit.

Modifications of the Embodiment

Figure 13:
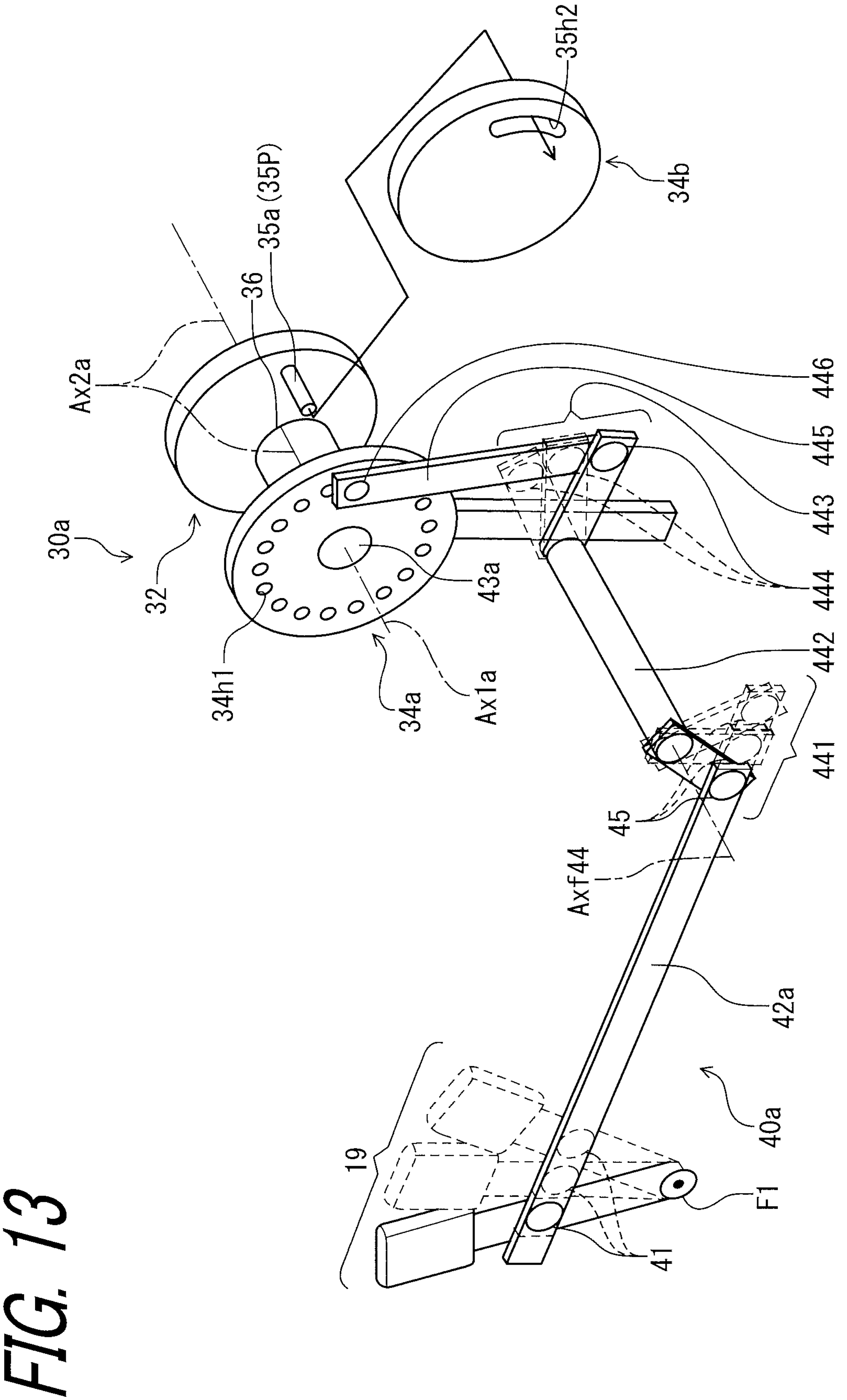
FIG. 13 illustrates a modification of the additional operational mechanism and the second displacement transmission mechanism.

The additional operational mechanism 30 and the second displacement transmission mechanism 40 are not limited to examples described above. FIG. 13 illustrates a modification 30*a* of the additional operational mechanism 30 and a modification 40*a* of the second displacement transmission mechanism 40.

The modification 30*a* includes a first rotational axis Ax1*a*, a second rotational axis Ax2*a*, the operational member 32, the first engagement member (34*a* or 34*b*), a second engagement member 35*a*, and the urging member 36. In this modification, the first engagement member (34*a* or 34*b*) has an engaging hole (34*h*1 or 34*h*2), and the second engagement member 35*a* has a pin 35*p* to be inserted into the engaging hole (34*h*1 or 34*h*2) when the second engagement member 35*a* engages with the first engagement member 34*a*. Specifically, the first engagement member 34*a* has multiple round holes 34*h*1, and the first engagement member 34*b* has at least one elongated hole 34*h*2. The second rotational axis Ax2*a* is substantially coaxial with the first rotational axis Ax1*a*. The operational member 32 is a knob to which the second engagement member 35*a* is directly attached. The urging member 36 is a compression spring provided between the operational member 32 and the first engagement member (34*a* or 34*b*).

The second displacement transmission mechanism 40 includes the first intermediate joint 41, a coupler link 42*a*, a base joint 43*a*, a linkage 44*a*, and the second intermediate joint 45. The first intermediate joint 41 and the second intermediate joint 45 has substantially the same structure as that explained in the above embodiment, thereby its description is omitted. The coupler link 42*a* is illustrated as a straight bar, but can be the coupler link 42 according to the above described embodiment. Since the base joint 43*a* is supported by a supporting member different from a supporting member supporting the base joint 43, the first rotational axis Ax1*a* is different from the rotational axis Ax1. However, the base joint 43*a* has substantially the same function as the function of the base joint 43. The linkage 44*a* is structurally different from the crank 44 which is described above.

The linkage 44*a* includes a link 441, a shaft 442, a link 443, a revolute joint 444, a link 445, and a revolute joint 446. The shaft 442 constitutes a fulcrum. The link 441 and the link 443, whose respective proximal portions are connected to the shaft 442, are rotatable together with the shaft 442 about a common rotational axis Axf44. The second intermediate joint 45 is attached to a distal portion of the link 441 which is opposite to the proximal portion of the link 441. The revolute joint 444 is attached to a distal portion of the link 443 which is opposite to the proximal portion of the link 443. The revolute joint 444 is attached to one end of the link 445 in a longitudinal direction of the link 445, and the other end of the link 445, which is opposite to the one end in the longitudinal direction, is attached to the first engagement member (34*a* or 34*b*) via the revolute joint 446. The fulcrum F1, the control lever 19, the first intermediate joint 41, the coupler link 42*a*, the second intermediate joint 45, the link 441, and the shaft 442 constitute a four-bar linkage. The shaft 442, the link 443, the revolute joint 444, the link 445, the revolute joint 446, the first engagement member (34*a* or 34*b*), and the base joint 43*a* constitute a four-bar linkage. Such structure can also provide the above advantageous effects which are described above.

The first displacement transmission mechanism 20 is not limited to a linkage as described above, but can be any mechanism to electrically or mechanically transmit a displacement of the control lever 19. The mechanisms to mechanically transmit the displacement include, for example, a gear structure, a cam mechanism, a belt-pulley mechanism, a combination of the above described mechanism including the linkage, and the like. The mechanisms to electrically transmit the displacement include, for example, a mechanism in which a controller is configured to detect a rotational angle of the fulcrum F1 with a potentiometer and to control the drive mechanism 14 in accordance with a value of the rotational angle.

The second displacement transmission mechanism 40, 40*a* is not limited to a linkage as described above, but can be any mechanism to mechanically transmit a displacement of the control lever 19. The mechanisms to mechanically transmit the displacement include, for example, a gear structure, a cam mechanism, a belt-pulley mechanism, a combination of the above described mechanism including the linkage, and the like.

The drive mechanism 14 is not limited to the hydraulic driving mechanism 14H, but can be a mechanism to utilize output of an electric motor or the engine 6. In this case, a transmission can be interposed between the link mechanism 10 and the electric motor or the engine 6. Ascending and descending of the link mechanism 10 can be realized by changing connection relationship of gears in the transmission in accordance with the displacement of the control lever 19.

The additional operational mechanism 30 can be a slider other than a structure shown in the embodiment. In this case, the base joint 43, 43*a* may not be a fulcrum, but can reciprocate. Furthermore, the shape and material of the additional operational mechanism 30 can be changed as far as its substantial function is not changed. For example, the first rotational axis Ax1 may not be parallel to the second rotational axis Ax2. In this case, bevel gears can be used as the first engagement member 34 and the second engagement member 35. Further, the urging member 36 can be another spring such as a tension spring or an elastic member such as rubber.

The present application refers to words "include" and derivatives as nonrestrictive terms for description of provision of constituent elements, without exclusion of any other constituent element not referred to in the present application. The same applies to words "have", "provided with", and derivatives thereof.

Expressions "member", "part", "element", "body", and "structure" may have a plurality of meanings indicating a single portion and a plurality of portions.

Ordinal numbers "first", "second", and the like are terms for simple distinction among configurations, without having any other meaning (e.g. specific order). For example, provision of a "first element" does not indicate provision of a "second element", and provision of the "second element" does not indicate provision of the "first element".

Expressions "substantially", "approximately", "about", and the like indicating degrees may each have a rational deviation not significantly changing a final result. All the numerical values referred to in the present application may be interpreted as including any one of the expressions "substantially", "approximately", "about", and the like.

In view of the above disclosure, the present invention can obviously include various modifications and alterations. The present invention may thus be implemented in any manner different from those specifically disclosed in the present application without departing from the spirit of the preset invention.

Obviously, numerous modifications and variations of the present invention are possible in light of the above teachings. It is therefore to be understood that within the scope of the appended claims, the invention may be practiced otherwise than as specifically described herein.

What is claimed is:

1. A work vehicle comprising:

a link mechanism to be equipped with a work implement;

a drive mechanism to drive the link mechanism to ascend and descend the work implement;

a control lever to be operated to ascend and descend the work implement;

a first displacement transmission mechanism linking the drive mechanism and the control lever to transmit a displacement of the control lever to the drive mechanism;

an additional operational mechanism configured to operate the control lever at a location apart from a position of the control lever; and a second displacement transmission mechanism mechanically linking the additional operational mechanism and the control lever without interposing the first displacement transmission mechanism to shift the control lever in accordance with an operation of the additional operational mechanism, wherein the second displacement transmission mechanism is a linkage, wherein the first displacement transmission mechanism includes a fulcrum about which the control lever is rotatable, and a follower connected to the control lever at the fulcrum to be rotatable together with the control lever about the fulcrum, wherein the linkage includes a first intermediate joint connected to the control lever, the first intermediate joint being different from the fulcrum, and a coupler link connected to the first intermediate joint to be rotatable about the first intermediate joint, wherein the linkage further includes a base joint connected to the additional operational mechanism to be rotated by the additional operational mechanism around a first rotational axis, a crank connected to the base joint to be rotatable together with the base joint around the first rotational axis, and a second intermediate joint linking the coupler link and the crank, the coupler link being rotatable about the second intermediate joint with respect to the crank, wherein the fulcrum has a fulcrum rotational axis nonparallel to the first rotational axis, and wherein at least one of the first intermediate joint and the second intermediate joint is a ball joint.

2. The work vehicle according to claim 1, wherein the coupler link is a rod that bends so as not to interfere with another operational mechanism between the control lever and the additional operational mechanism.

3. The work vehicle according to claim 2, wherein the another operational mechanism includes a lever rotatable around a lever rotational axis, wherein the second intermediate joint is movable on a plane that is higher than the lever rotational axis in a height direction along a height of the work vehicle and is rotatable around a joint rotational axis that is substantially parallel to the plane, wherein the first intermediate joint is a ball joint, wherein the rod has a bending point between the lever rotational axis and the first intermediate joint in a front-rear direction of the work vehicle, and wherein the rod extends from the second intermediate joint to the bending point in a first extending direction such that the rod is provided above the lever rotational axis in the height direction and extends from the bending point to the first intermediate joint in a second extending direction slanted from the first extending direction, downward in the height direction.

4. A work vehicle comprising:

a link mechanism to be equipped with a work implement;

a drive mechanism to drive the link mechanism to ascend and descend the work implement;

a control lever to be operated to ascend and descend the work implement;

a first displacement transmission mechanism linking the drive mechanism and the control lever to transmit a displacement of the control lever to the drive mechanism;

an additional operational mechanism configured to operate the control lever at a location apart from a position of the control lever; and a second displacement transmission mechanism mechanically linking the additional operational mechanism and the control lever without interposing the first displacement transmission mechanism to shift the control lever in accordance with an operation of the additional operational mechanism, wherein the additional operational mechanism includes a first rotational axis;

a second rotational axis;

a first engagement member mechanically connected to the control lever and rotatable around the first rotational axis in accordance with a movement of the control lever;

an operational member slidable in an axial direction of the second rotational axis to be operated by an operator;

a second engagement member slidable together with the operational member in the axial direction and rotatable around the second rotational axis, the second engagement member being configured to engage with the first engagement member to rotate the first engagement member; and an urging member to separate the second engagement member from the first engagement member in the axial direction so that the second engagement member does not engage with the first engagement member.

5. The work vehicle according to claim 4, wherein the operational member is connected to the second engagement member to be pushed by the operator to engage the second engagement member with the first engagement member, the operational member being configured to be rotated by the operator to rotate the second engagement member and the first engagement member to shift the control lever.

6. The work vehicle according to claim 5, wherein the operational member is a knob.

7. The work vehicle according to claim 4, wherein the first engagement member and the second engagement member are gears.

8. The work vehicle according to claim 7, wherein the second rotational axis is substantially parallel to the first rotational axis.

9. A work vehicle comprising:

a link mechanism to be equipped with a work implement;

a drive mechanism to drive the link mechanism to ascend and descend the work implement;

a control lever to be operated to ascend and descend the work implement;

a first displacement transmission mechanism linking the drive mechanism and the control lever to transmit a displacement of the control lever to the drive mechanism;

an additional operational mechanism configured to operate the control lever at a location apart from a position of the control lever;

a second displacement transmission mechanism mechanically linking the additional operational mechanism and the control lever without interposing the first displacement transmission mechanism to shift the control lever in accordance with an operation of the additional operational mechanism; and a cabin accommodating the control lever and the additional operational mechanism, the additional operational mechanism being provided adjacent to a window of the cabin, the window being configured to be opened by an operator outside the cabin.

10. The work vehicle according to claim 9, wherein the second rotational axis extends in a direction slanted toward the window from a height direction along a height of the work vehicle.

11. The work vehicle according to claim 9, wherein the cabin is defined by a roof, a front pillar, a rear pillar, and a center pillar, the front pillar, the rear pillar, and the center pillar supporting the roof, the front pillar being provided in front of the link mechanism in a front-rear direction of the work vehicle, the rear pillar being provided opposite to the front pillar in the front-rear direction, the center pillar being provided between the front pillar and the rear pillar in the front-rear direction, wherein the control lever is between the front pillar and the center pillar in the front-rear direction, and wherein the additional operational mechanism is provided between the center pillar and the rear pillar in the front-rear direction.

12. The work vehicle according to claim 11, wherein the additional operational mechanism overlaps with a base frame linking a bottom of the front pillar, a bottom of the rear pillar, and a bottom of the center pillar.

13. The work vehicle according to claim 11, wherein the work vehicle has a console between a driver's seat and a base frame in a width direction along a width of the work vehicle, the control lever and the additional operational mechanism being provided to the console, the base frame linking a bottom of the front pillar, a bottom of the rear pillar, and a bottom of the center pillar, and wherein all operational tools that are provided to the console except for the additional operational mechanism are provided in front of a rear end of the center pillar.

14. A work vehicle comprising:

a link mechanism to be equipped with a work implement;

a drive mechanism to drive the link mechanism to ascend and descend the work implement;

a control lever to be operated to ascend and descend the work implement;

a first displacement transmission mechanism linking the drive mechanism and the control lever to transmit a displacement of the control lever to the drive mechanism;

an additional operational mechanism configured to operate the control lever at a location apart from a position of the control lever; and a second displacement transmission mechanism mechanically linking the additional operational mechanism and the control lever without interposing the first displacement transmission mechanism to shift the control lever in accordance with an operation of the additional operational mechanism, wherein a height of the additional operational mechanism from a ground on which the work vehicle is provided is less than or equal to 1800 mm.

15. A work vehicle comprising:

a link mechanism to be equipped with a work implement;

a drive mechanism to drive the link mechanism to ascend and descend the work implement;

a control lever to be operated to ascend and descend the work implement;

a first displacement transmission mechanism linking the drive mechanism and the control lever to transmit a displacement of the control lever to the drive mechanism;

an additional operational mechanism configured to operate the control lever at a location apart from a position of the control lever;

a second displacement transmission mechanism mechanically linking the additional operational mechanism and the control lever without interposing the first displacement transmission mechanism to shift the control lever in accordance with an operation of the additional operational mechanism; and a power take-off shaft to output motive power to drive the work implement, a distance between the power take off shaft and the additional operational mechanism in a width direction along a width of the work vehicle being at least 550 mm.

16. A work vehicle comprising:

a link mechanism to be equipped with a work implement;

a drive mechanism to drive the link mechanism to ascend and descend the work implement;

a control lever to be operated to ascend and descend the work implement;

a first displacement transmission mechanism linking the drive mechanism and the control lever to transmit a displacement of the control lever to the drive mechanism;

an additional operational mechanism configured to operate the control lever at a location apart from a position of the control lever; and a second displacement transmission mechanism mechanically linking the additional operational mechanism and the control lever without interposing the first displacement transmission mechanism to shift the control lever in accordance with an operation of the additional operational mechanism, wherein the drive mechanism is a hydraulic driving mechanism comprising:

a hydraulic valve having a spool connected to the first displacement transmission mechanism, a position of the spool changing in accordance with the displacement of the control lever; and a hydraulic cylinder to extend and contract based on the position of the spool to move the link mechanism.

17. The work vehicle according to claim 16, wherein the second displacement transmission mechanism is a linkage.

18. The work vehicle according to claim 17, wherein the first displacement transmission mechanism includes a fulcrum about which the control lever is rotatable, and a follower connected to the control lever at the fulcrum to be rotatable together with the control lever about the fulcrum, and wherein the linkage includes a first intermediate joint connected to the control lever, the first intermediate joint being different from the fulcrum, and a coupler link connected to the first intermediate joint to be rotatable about the first intermediate joint.

19. The work vehicle according to claim 18, wherein the linkage further includes a base joint connected to the additional operational mechanism to be rotated by the additional operational mechanism around a first rotational axis, a crank connected to the base joint to be rotatable together with the base joint around the first rotational axis, and a second intermediate joint linking the coupler link and the crank, the coupler link being rotatable about the second intermediate joint with respect to the crank.

20. The work vehicle according to claim 19, wherein the fulcrum has a fulcrum rotational axis non-parallel to the first rotational axis, and wherein at least one of the first intermediate joint and the second intermediate joint is a ball joint.

* * * * *